United States Patent
Currans et al.

(10) Patent No.: US 6,820,064 B1
(45) Date of Patent: Nov. 16, 2004

(54) E-COMMERCE CONSUMABLES

(75) Inventors: Kevin G. Currans, Philomath, OR (US); Henry W. Sang, Jr., Cupertino, CA (US); John A. Bertani, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 382 days.

(21) Appl. No.: 09/652,460

(22) Filed: Aug. 31, 2000

(51) Int. Cl.$^7$ .............................................. G06F 17/60
(52) U.S. Cl. ................... 705/77; 705/1; 347/1
(58) Field of Search ................ 705/77, 74, 1; 347/1

(56) References Cited

U.S. PATENT DOCUMENTS

| | | | |
|---|---|---|---|
| 5,319,562 A | | 6/1994 | Whitehouse ................ 364/464 |
| 5,511,121 A | * | 4/1996 | Yacobi ......................... 380/30 |
| 5,606,613 A | | 2/1997 | Lee et al. ..................... 380/21 |
| 5,812,991 A | | 9/1998 | Kara ........................... 705/410 |
| 5,872,844 A | * | 2/1999 | Yacobi ........................ 705/39 |
| 5,936,221 A | * | 8/1999 | Corder et al. ............... 235/379 |
| 6,005,945 A | | 12/1999 | Whitehouse .................. 380/51 |
| 6,424,954 B1 | * | 7/2002 | Leon .......................... 705/401 |
| 2002/0146122 A1 | * | 10/2002 | Vestergaard et al. ........ 380/231 |

FOREIGN PATENT DOCUMENTS

| | | | | |
|---|---|---|---|---|
| AU | WO 99/343311 | * | 8/1999 | ........... G06F/17/60 |

OTHER PUBLICATIONS

Chaum, David Achieving electronic privacy, Internet, Aug. 1992 pp. 1–8.*

* cited by examiner

*Primary Examiner*—James P. Trammell
*Assistant Examiner*—John Winter
(74) *Attorney, Agent, or Firm*—Timothy F. Myers

(57) ABSTRACT

A consumable article includes a consumable item and a memory device. The memory device is organized to represent currency. Use of the consumable item causes the memory device to be reorganized. The consumable article is used in an apparatus that has a control circuit that can update the memory device to modify the amount of currency when the apparatus consumes the consumable item. The apparatus optionally includes a network interface coupled to the control circuit that interfaces to a clearinghouse for reconciling the amount of currency and use of the consumable item.

3 Claims, 10 Drawing Sheets

E-COMMERCE CONSUMABLES

FIELD OF THE INVENTION

The invention relates to electronic commerce, more particularly the invention relates to using consumable articles as barter or collateral security for use of privileged content transactions.

BACKGROUND OF THE INVENTION

Electronic devices such as personal computers and personal data assistants (PDAs) are becoming more powerful and able to perform multimedia functions. These functions allow for the presentation of several multimedia content sources such as music, pictures, video, and other created works. In addition to more powerful computers, the Internet is becoming more pervasive and most computers and other electronic devices are able to interconnect. This interconnection occurs over phoneline, cable, satellite and other wired and wireless services. The ability to retrieve multimedia content via the Internet and to view, copy, print, play, or archive this content has created a tension between the owners of the content and users of multimedia equipped electronic devices. Because devices such as personal computers can be disconnected from the Internet and the multimedia content used remotely, the owners of the content cannot adequately monitor the use of their content and receive proper royalty or other pecuniary payments for its use. Further, some hardware manufacturers have designed low-cost electronic devices that allow for downloading multimedia content from the Internet and allowing the user to continually use the content remotely such as with "MP3" music playing devices. These low cost devices are rapidly being accepted and the potential for abuse of content owner's proprietary rights is growing.

On difficulty in implementing a method of debiting for the use of proprietary content is that pecuniary payments tend to be very small on a per use basis and the transaction costs of processing credit cards or other credit information is often more expensive than the debit charge for the use of the content. Therefore, there is a need for a method to provide payment exchange efficiently and accurately when dealing with small financial transactions or micropayments such as per-use royalty based charges.

SUMMARY

A consumable article includes a consumable item and a memory device. The memory device is organized to represent currency. Use of the consumable item causes the memory device to be reorganized. The consumable article is used in an apparatus that has a control circuit that can update the memory device to modify the amount of currency when the apparatus consumes the consumable item. The apparatus optionally includes a network interface coupled to the control circuit that interfaces to a clearinghouse for reconciling the amount of currency and use of the consumable item.

DETAILED DESCRIPTION OF THE PREFERRED AND ALTERNATE EMBODIMENTS

Figure 1:
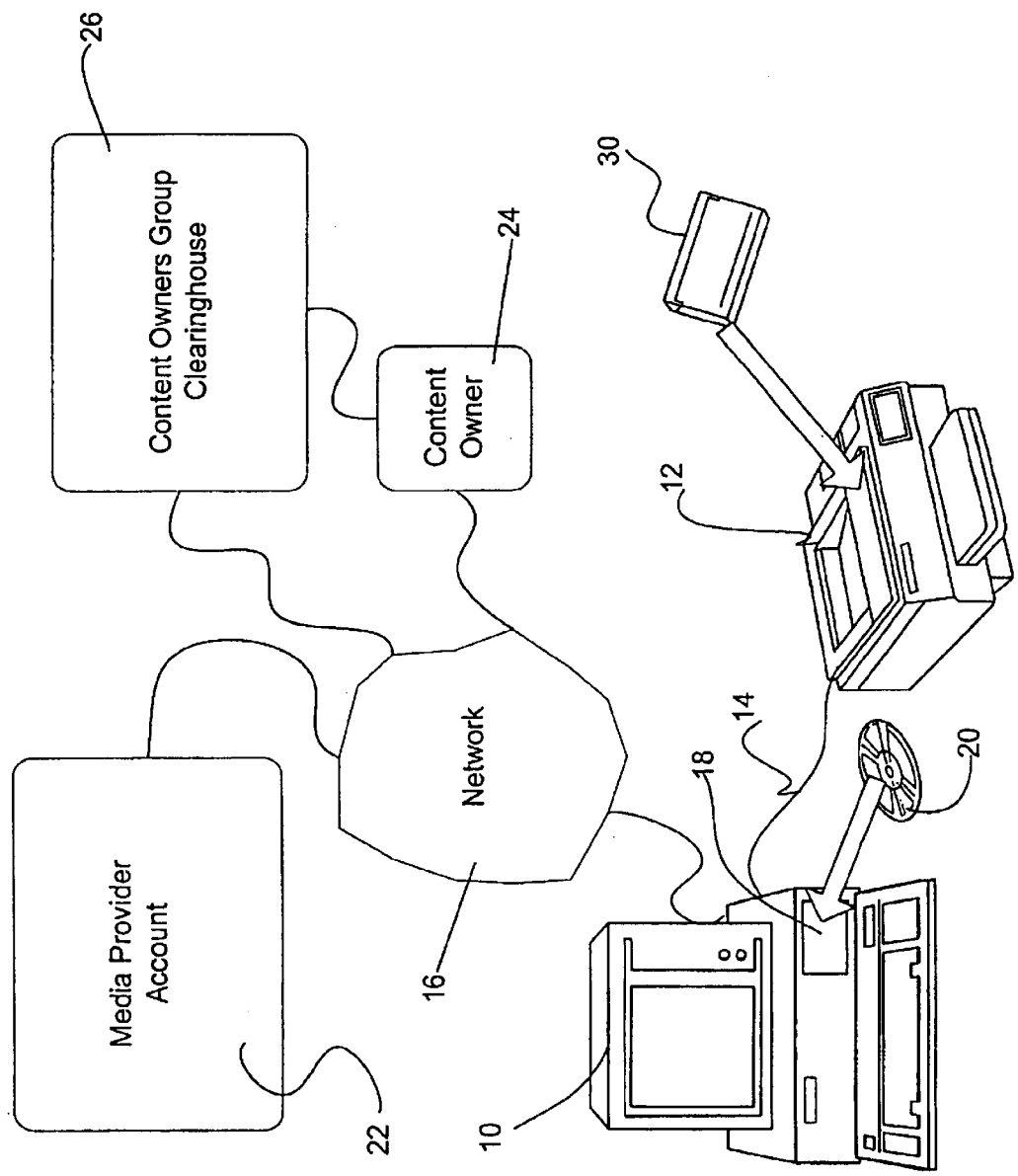
FIG. 1 is an exemplary diagram a computer system that uses at least one aspect of the invention.

One aspect of the invention is to allow a consumable item, such as ink or toner for example, to be used as collateral security for a royalty or other pecuniary charge or debit incurred when using other's copyrighted or privileged multimedia content or material.

Another aspect of the invention is to allow users of consumable items to pre-pay for the right to reproduce copyrighted or privilege material when purchasing the consumable items.

A further aspect is to allow a user that has used their consumable item as collateral security to reconcile and redeem the debt to release the encumbrance on the consumable item.

A further aspect of the invention is to allow a user to transfer unused credit from an expended consumable item to another replacement consumable item.

The invention allows owners of copyrighted or other privileged material to collect payment for use of that material by users of electronic devices. The invention allows for remote use of the privileged material by allowing a consumable item or a portion of it to be used as collateral security or "mortgaged" until a debit charge is reconciled. Optionally, use of the consumable item can be just be bartered, that is prevented from further being used, in order to allow payment for the use of the privileged material. Another option is to allow a consumable article, such as a printer toner cartridge, or ink-jet cartridge to contain a smart card circuit that can include digital cash that allows for prepayment and debiting during use.

Owners of copyrighted or other privileged content would digitally sign their content. That is, a digital representation of the owner and the amount of charge for use are digitally encoded with the privileged content. Several different methods of digital signing exist and are known to those skilled in the art, such as digital watermarking and some forms of digital compression encoding. When the privileged content is used, the electronic device detects the digital ownership and requests from the user of the electronic device if they wish to be debited for use of the privileged content. Optionally, the charge can be automatically debited for use. In addition, multiple transactions can be recorded before having to reconcile payment. This allows several "mircopayments" to occur before needing to make larger total payment. The step of adding a digital signature to the content is preferably performed by having the content owner join a group of content owners in a clearinghouse that distributes signing software and digital encryption or signing keys that are embedded into the digital content, preferably invisibly. The clearinghouse also preferably distributes the privileged content, but optionally any distribution source can be used. When the privileged content is acquired by a consumer and used on an electronic device that is connected to the consumable article, the consumer can either use a portion of the consumable article as a collateral security for later payment or barter a portion of the consumable article for payment. When the electronic device is later connected to a network, such as the Internet, contact with the clearinghouse is made and payment reconciliation occurs. The reconciliation includes transmittal of any content owners' digital signature, the number of uses of any privileged material and how all debits incurred are to be paid. If the consumable article were used as security, the reconciliation includes a payment method such as a credit card or account number to be debited. When payment is confirmed, the collateral security on the consumable article is released and that portion of the consumable article can be used again. If the consumable article was used as a barter instrument, then the reconciliation includes transmitting the account for the consumable article media account (presumptively the manufacturer of the consumable article, but optionally other third party sources) from which to transfer payment from to the content owners' accounts. If the consumable article includes a smart card circuit, then the reconciliation just transfers the digital cash that has been debited from the smart card circuit to the content owner's account. Optionally, the consumable article owner can purchase more digital cash to be stored on the smart card circuit for later use. If the consumable article has expended its consumable item, any remaining digital cash remaining in the smart card circuit can be transferred to the content users account to transfer to a new replacement consumable article.

For example, assume a user wishes to print multiple photographs on an ink-jet printer that require small and uneconomical financial transactions for use of the privileged content. The user purchases a consumable ink-jet pen for their printer. The ink-jet pen includes an on-board electronic device that is controlled via a printer driver or other software. The user then wishes to print a photograph remotely without a direct connection the photograph owner's website or associated clearinghouse. When the print command is issued the printer driver or other software detects that the photograph is privileged content. The cost for printing is preferably included in the digital signature. The user is informed of the cost required to print the photograph. If the charge is approved, the print request continues. The printer driver or other software checks to see that the cost required remains in the digital cash in electronic circuit, which is a memory device or smart card, circuit. The amount of digital cash may either be a pre-paid amount or it may be based on the value of the remaining consumable ink within the print cartridge. That is if a $30 print cartridge has $10 of ink remaining, $10 dollars is available in the electronic circuit to be used as digital cash. If sufficient digital currency remains in the print cartridge, then printing continues. As each photograph is printed, the amount of digital currency is updated electronically in the print cartridge to reflect the charge incurred and the amount of ink used in printing. In the case of just a prepaid amount of digital currency, the charge incurred is simply deducted from the electronic circuit in the ink cartridge. When the digital currency account is depleted, then it is not possible to print privileged content using this ink cartridge. However, when the user contacts the owner's website or an appropriate owner's group clearinghouse, copies of the financial transactions are transmitted and indicate which owners should receive corresponding payments. In the case where the ink cartridge's ink has been used as collateral, once payment by credit card or other means is verified, the ink cartridge can recover use of the remaining ink.

FIG. 1 is an exemplary block diagram of a computer system, which includes at least one aspect of the invention. An electronic device, shown as computer 10, is coupled to a printer 12 either with a direct connection 14 or via a network, such as an intranet or the Internet. Computer 10 optionally includes a media device 18, such as a CD-ROM or DVD drive, which accepts media 20, such as a CD-ROM or DVD disc containing privileged content. Optionally, the privileged content can be downloaded or pulled into the computer 10 via network 16 from preferably either a content owner 24 or a clearinghouse 26 of content owners. Optionally, the privilege content can be acquired from any Internet or intranet website that supports keeping the content owner's digital signature with the privileged content. Thus the content owner 24 can optionally maintain their own website or preferably work with a content owner group clearinghouse 26 to minimize the number of websites that need to be visited for reconciliation of payments. Printer 12 accepts a consumable article 30, shown here as a media creation cartridge such as laser-jet toner cartridge for example, but optionally it can be any media creation cartridge such as an ink-jet printer cartridge, printer ribbon, plotter pen cartridge or other consumable article such as a battery, and other energy delivery vehicle or fuel sources. Other content creation sources such as a plotter could also be used in place of printer 12. Consumable article 30 includes a consumable item and a memory device that is organized to represent currency in a digital format. The amount of currency stored in the memory is proportionally related to the amount of the consumable item. When the consumable item is used or expended, the contents of the memory device are reorganized to reflect the amount of the consumable item remaining.

Figure 2:
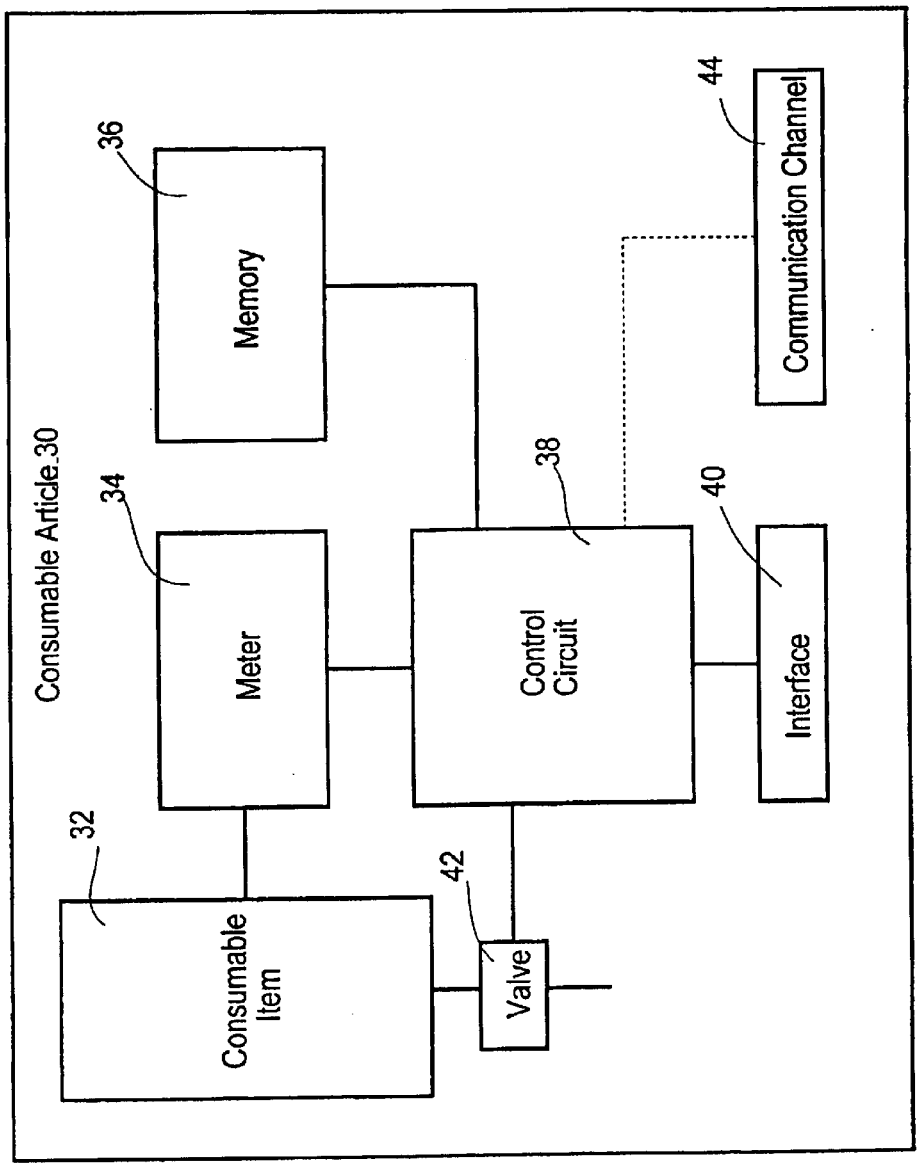
FIG. 2 is an exemplary block diagram of a consumable article that incorporates aspects of the invention.

FIG. 2 is a block diagram of an exemplary embodiment of consumable article 30. The consumable article 30 includes a consumable item 32 that can be measured with a meter 34. The use of the consumable item 32 can be controlled with a valve 42 or other equivalent mechanism. A control circuit 38 that is further connected to memory 36 and meter 34 operates valve 42. Control circuit 38 is able to measure the amount of consumable item 32 and accordingly represent the amount in an organized fashion in memory 36. Often times the consumable item represents a fair amount of money, at least in replacement cost. The amount of consumable item 32 that is stored in memory 36 can be used as "collateral security", i.e. mortgaged, or "bartered" for digital cash which is used to pay the owner of privileged content used by the user of the consumable item. Control circuit 38 has at least one interface 40 used to control dispensing the consumable item 32. A separate communication channel 44 is provided to let the control circuit 38 communicate currency transactions that are recorded in memory 36. Optionally, communication channel 44 and interface 40 may be combined into a single interface. Due to security concerns, it is preferable to have a separate communication channel 44 that provides a non-public, secure, and preferably encrypted interface.

Figure 3:
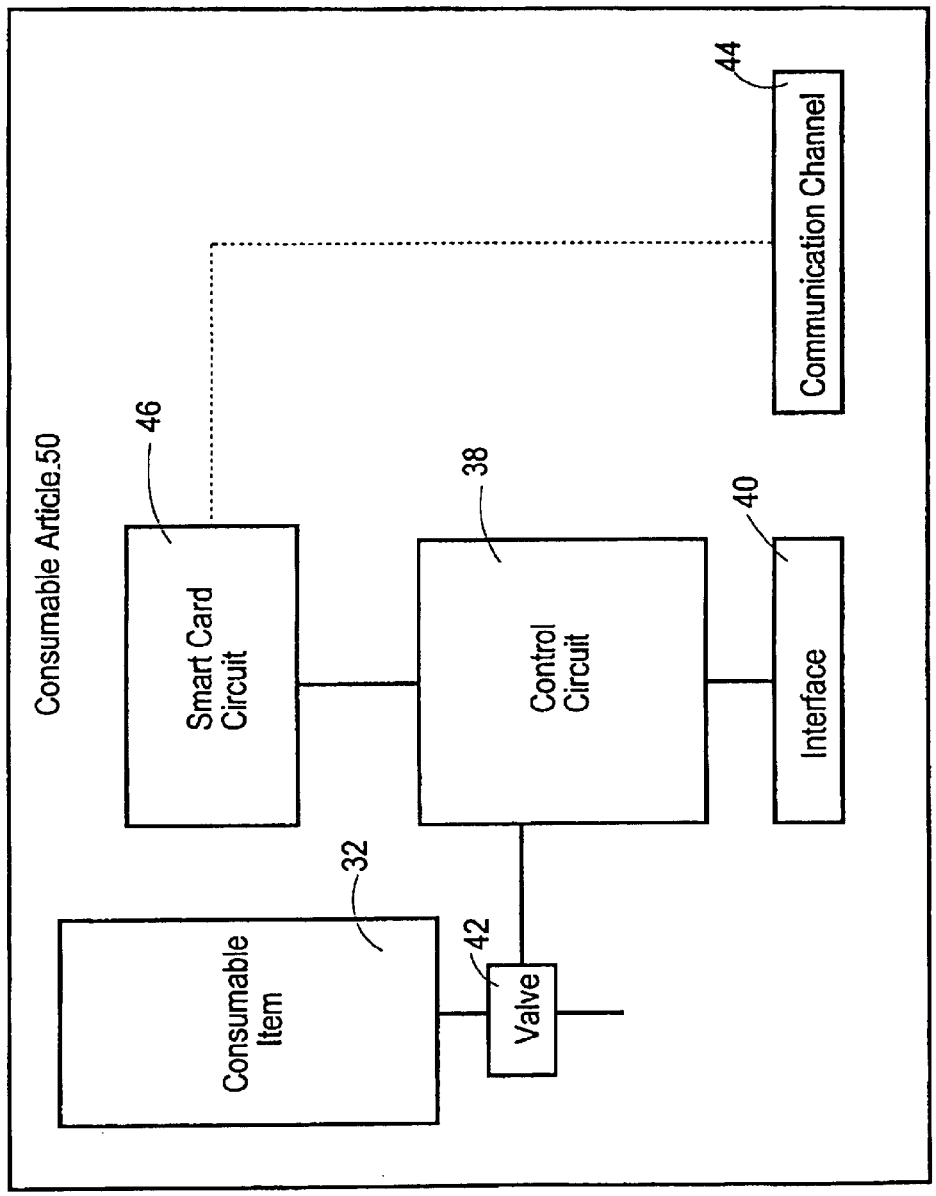
FIG. 3 is an exemplary alternative block diagram of a consumable article that incorporates aspects of the invention.

FIG. 3 is a block diagram of an exemplary alternative embodiment of a consumable article 50. In this embodiment, a smart card circuit 46 is connected to control circuit 38 and can be accessed either via interface 40 using control circuit 38 or separately through communication channel 44. The control circuit 38 controls the dispensing of consumable item 32 such as with a valve 42.

Figure 4:
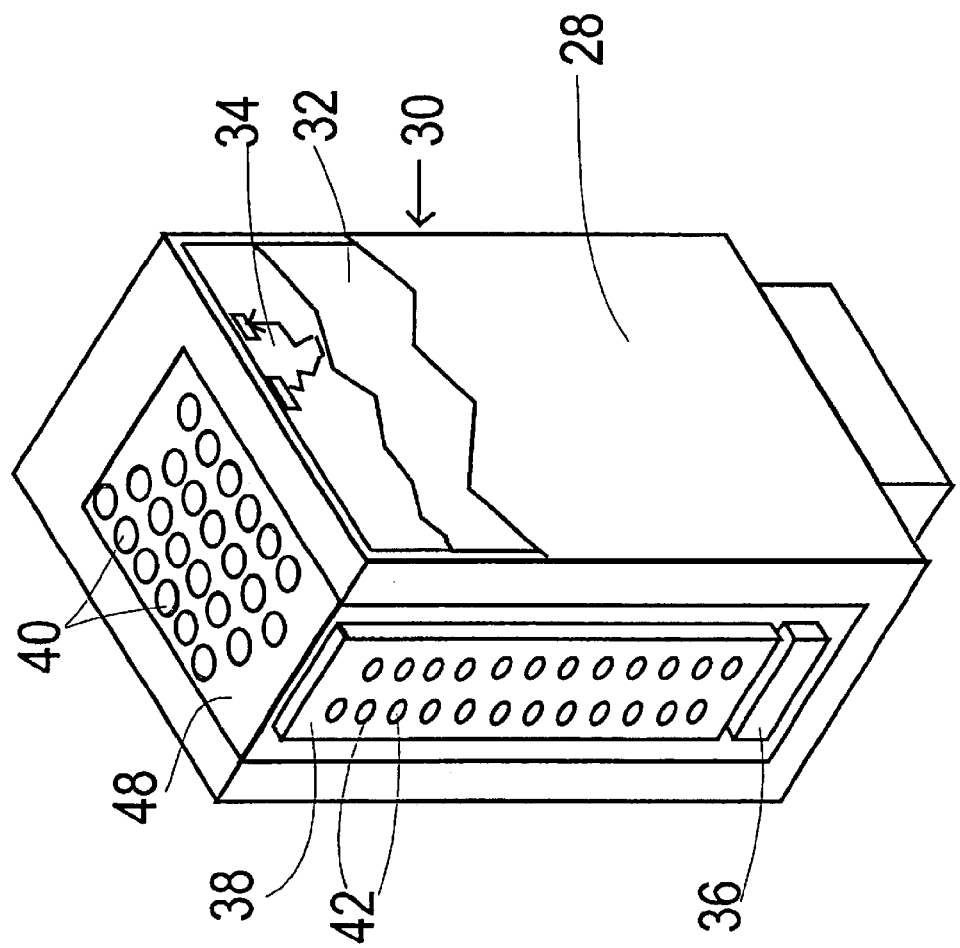
FIG. 4 is an exemplary physical embodiment of the consumable article of FIG. 2 shown as an ink-jet cartridge.

FIG. 4 is an exemplary embodiment of the consumable article 30 of FIG. 2, represented here as an ink-jet cartridge. Consumable item 32, an ink or other fluid, is stored in a container 28. The amount of consumable item 32 is measured with a meter 34, shown as a light emitting diode and a sensor. The consumable item 3 is dispensed via valves 42, shown as nozzles or orifices. The control circuit 38 is integrated with valves 42 on a single monolithic integrated circuit die. Interface 40 is shown as an array of contacts on a flex circuit 48 that connects interface 40 to control circuit 38 and memory 36 that is optionally separate or preferably integrated into the integrated circuit containing control circuit 38. Alternatively, memory 36 may be replaced with a smart card circuit 46 (see FIG. 3).

Figure 5:
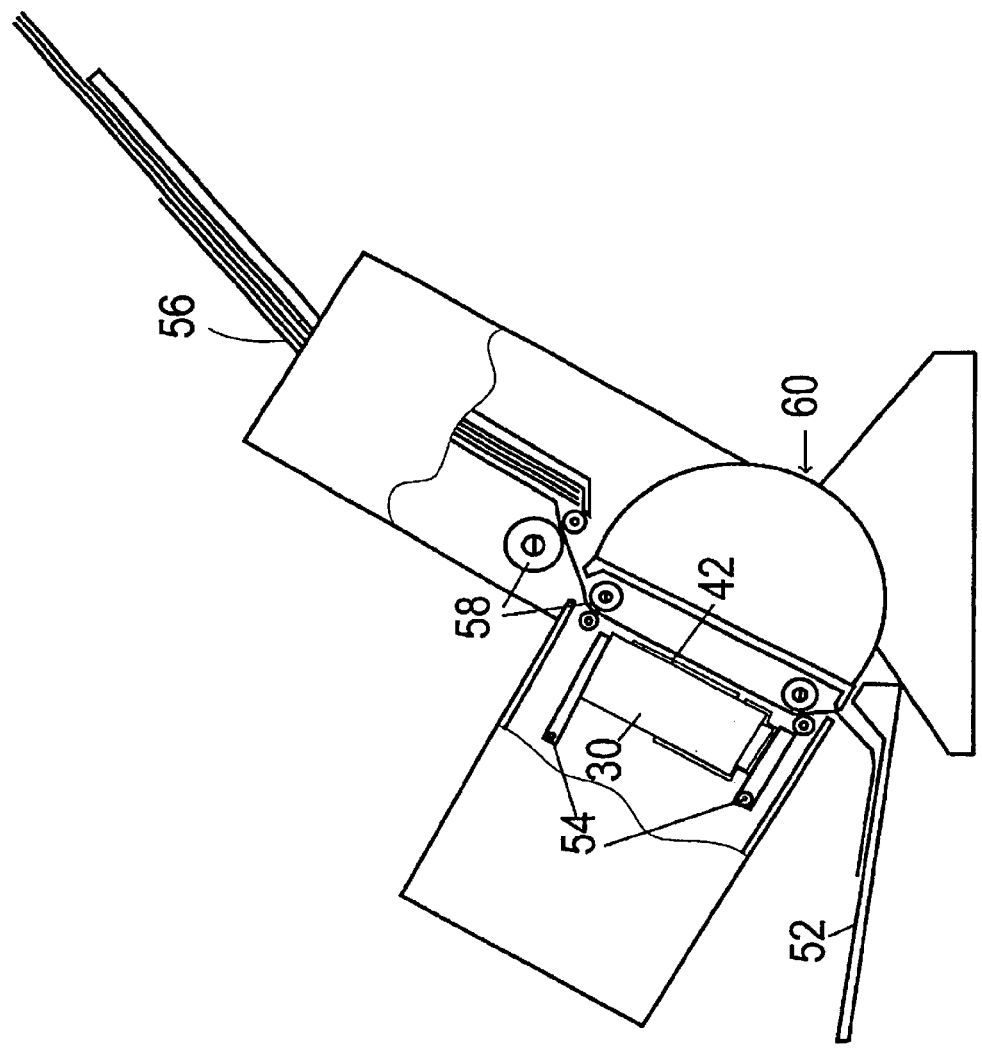
FIG. 5 is an exemplary apparatus, a printer that uses the consumable article of FIG. 4.

FIG. 5 is an exemplary illustration of a printing apparatus 60 that uses the consumable article 30 of FIG. 4 to print privileged content from a personal computer or other electronic device. The printing apparatus 60 has a carriage 54 that holds consumable article 30 and contacts with interface 40 of the consumable article 30. The carriage sweeps back and forth in one direction across paper 56. The paper 56 is transported or fed in an opposing direction to the carriage 54 movement by paper feed 58. When printing, the consumable item, in this example—ink, is place on the paper 56 using valve 42, the nozzles on consumable article 30. The paper 56 when printed is placed by paper feed 58 on an output tray 52.

When privileged content is printed, a portion of the consumable item, i.e. ink, can be "bartered" or "collaterally secured" to ensure future payment. Before the ink can be used as security or payment, the control circuit within the consumable article measures the amount of ink remaining to ensure that sufficient value exists to secure the payment. If not, printing of the privileged content is not allowed.

In addition to printing privileged content, if the printer is connected to a personal computer or other electronic device that can play or use privileged content such as audio (MP3 files), pictures (JPEG, TIFF, etc. files) or video (MPEG files), the consumable item can still be "bartered" or "collaterally secured". If the user barters or secures the entire consumable item, such as ink, within the consumable article 30, the user will be unable to print even non-privileged material. This action will encourage the user to reconcile with the content owner's website or a clearinghouse in order to recover use of the consumable item.

Figure 6:
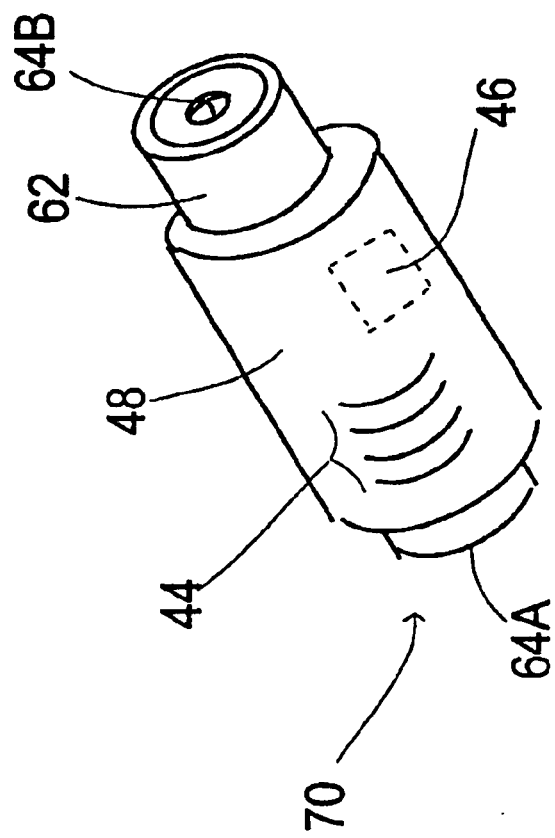
FIG. 6 is a physical embodiment of the consumable article of FIG. 3 shown as a battery.

FIG. 6 is an exemplary alternative physical embodiment of a consumable article, a customized battery 70. In this embodiment, the consumable item is the energy stored within the battery 62. A special sleeve 48 is placed around the battery 62 to provide storage for preferably a smart card circuit 46 accessed using communication channel 44. The output from the battery 62 is provided by battery contacts 64A and 64B. Battery 62 can be of any conventional chemistry such as alkaline, nickel-metal hydride, nickel cadmium, carbon-zinc, or lithium ion. For this embodiment, preferably the battery is designed not to be rechargeable. For a lithium ion battery, the cell voltage is approximately 3.1 volts. Thus, to provide a typical 1.5V output, some lithium ion cells have a voltage converter circuit to translate from the 3.1V cell voltage to the desired 1.5V output. Such a battery can be modified to include control circuit 38, meter 34, and memory 36 of FIG. 2 such that the energy of the battery can be used for "bartering" or "collateral security." By providing a separate sleeve 48 about the battery 62, the battery 62 can only be used in special electronic devices that can use the interface channel 44 to communicate to the smart cart circuit 46.

Figure 7:
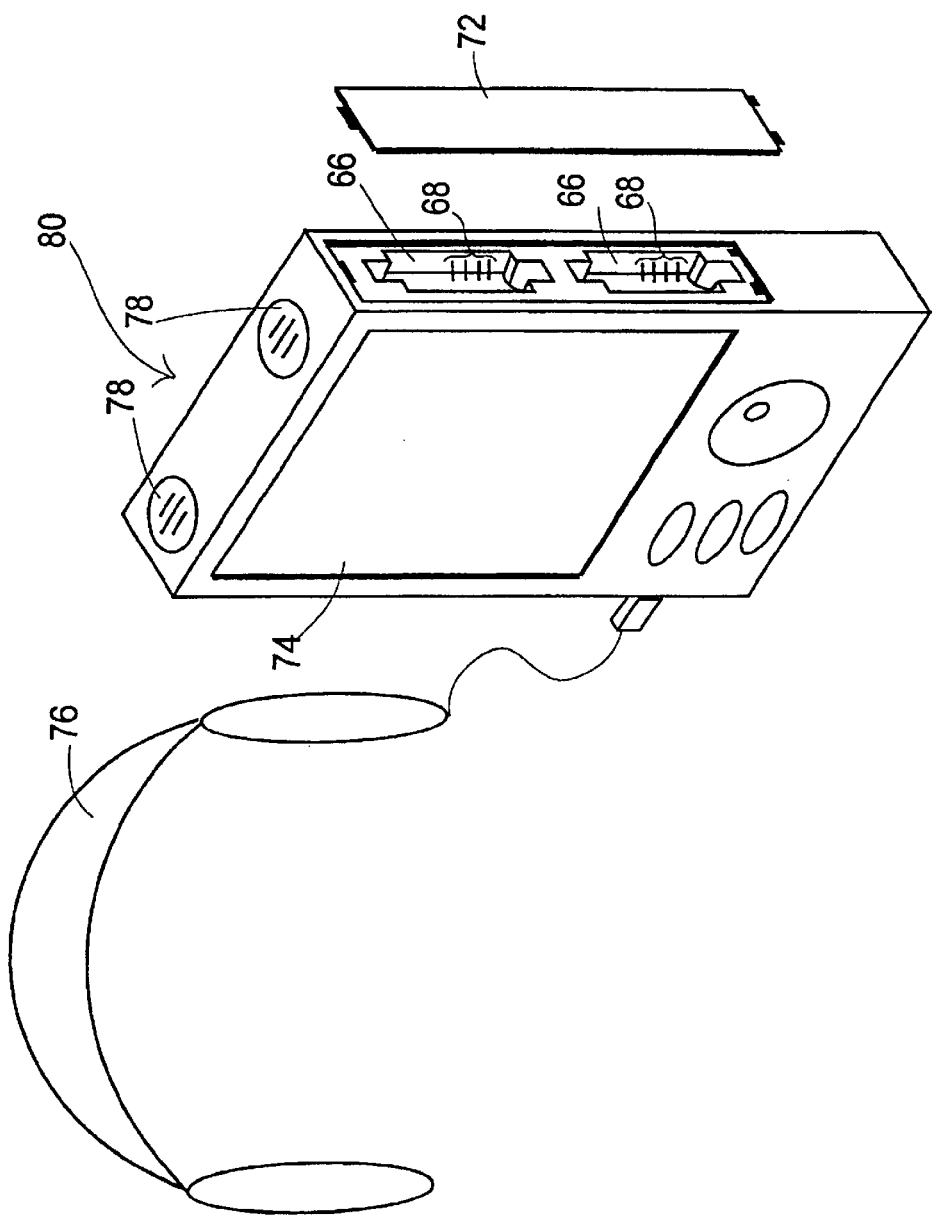
FIG. 7 is an exemplary apparatus, a personal data assistant (PDA) that uses the consumable article of FIG. 6.

FIG. 7 is an illustration of an exemplary electronic device, a personal data assistant (PDA) 80, that accepts the customized battery 70 of FIG. 6. PDA 80 is a multifunction multimedia device such as a PocketPC made by Hewlett-Packard with a Microsoft operating system. For example, it can reproduce music, such as an MP3 song using headphones 76 or alternatively speakers 78. In addition, screen 74 can be used to display still photos such as JPEG files or TIFF images and other formats known to those skilled in the art. Screen 74 along with the audio devices, headphones 76 or speakers 78, can be used to view video clips or MPEG movies.

Customized battery 70 is inserted into battery cavities 66 and contacts 68 are used to interface with communication channel 44 of customized battery 70. The batteries are held in place by battery door 72. Optionally, if no privileged content is anticipated to be used, standard batteries may be inserted into battery cavities 66 and the PDA 80 operated normally. However, with the customized battery 70, when privileged content is played, royalty or other pecuniary charges for use are subtracted from the smart card circuit 46. Optionally, if customized battery 70 has a control circuit 38 that can measure the amount of energy within the battery and is capable of restricting the battery output, the user can "barter" or "collaterally secure" the battery's energy for credit to use the privilege content. If a "barter" or "collaterally secure" transaction occurs, the control circuit artificially reduces the battery's operating life. If the battery does not have enough energy remaining to barter/collaterally secure, the user of the PDA 80 will be unable to use the privileged content. The user of the PDA 80 can recover the energy in the battery by connecting the PDA 80 to the content owner's website or a content owner's group clearinghouse and reconciling by making a payment for use of the privileged content. When payment is verified, the control circuit will allow the energy that was bartered/collaterally secured to be used.

Figure 8:
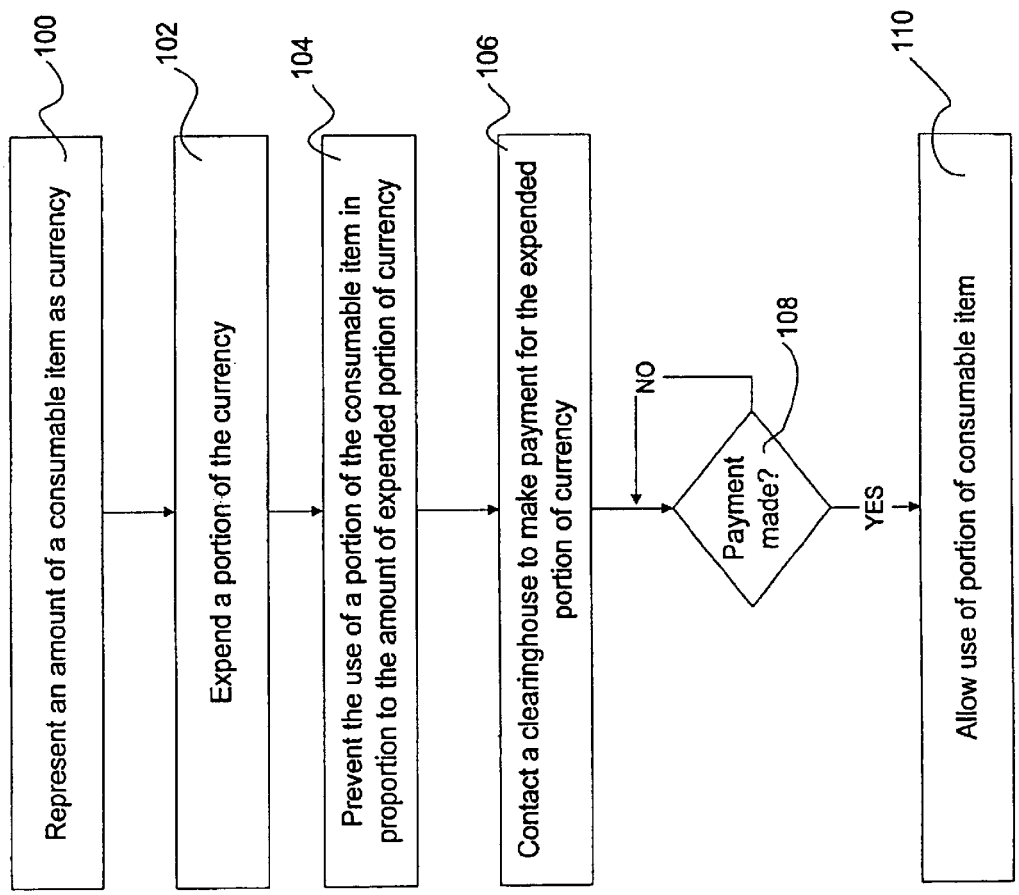
FIG. 8 is a flowchart of an exemplary method of using a consumable article.

FIG. 8 is an exemplary flowchart for a method of using a consumable article to exchange payments. In step 100, the amount of the consumable item within the consumable article is represented as an amount of currency, preferably in the memory within the consumable article. In step 102, by using royalty or privileged content a portion of the currency is expended. In step 104, a portion of the consumable item, in proportion to the amount of the expended portion of currency, is prevented from being used. In step 106, reconciliation occurs by contacting a clearinghouse to make a payment for the expended portion of the currency. When the payment is made in step 108 the in step 110, the use of the portion of the consumable item that was prevented from being used is now allowed to be used.

Figure 9:
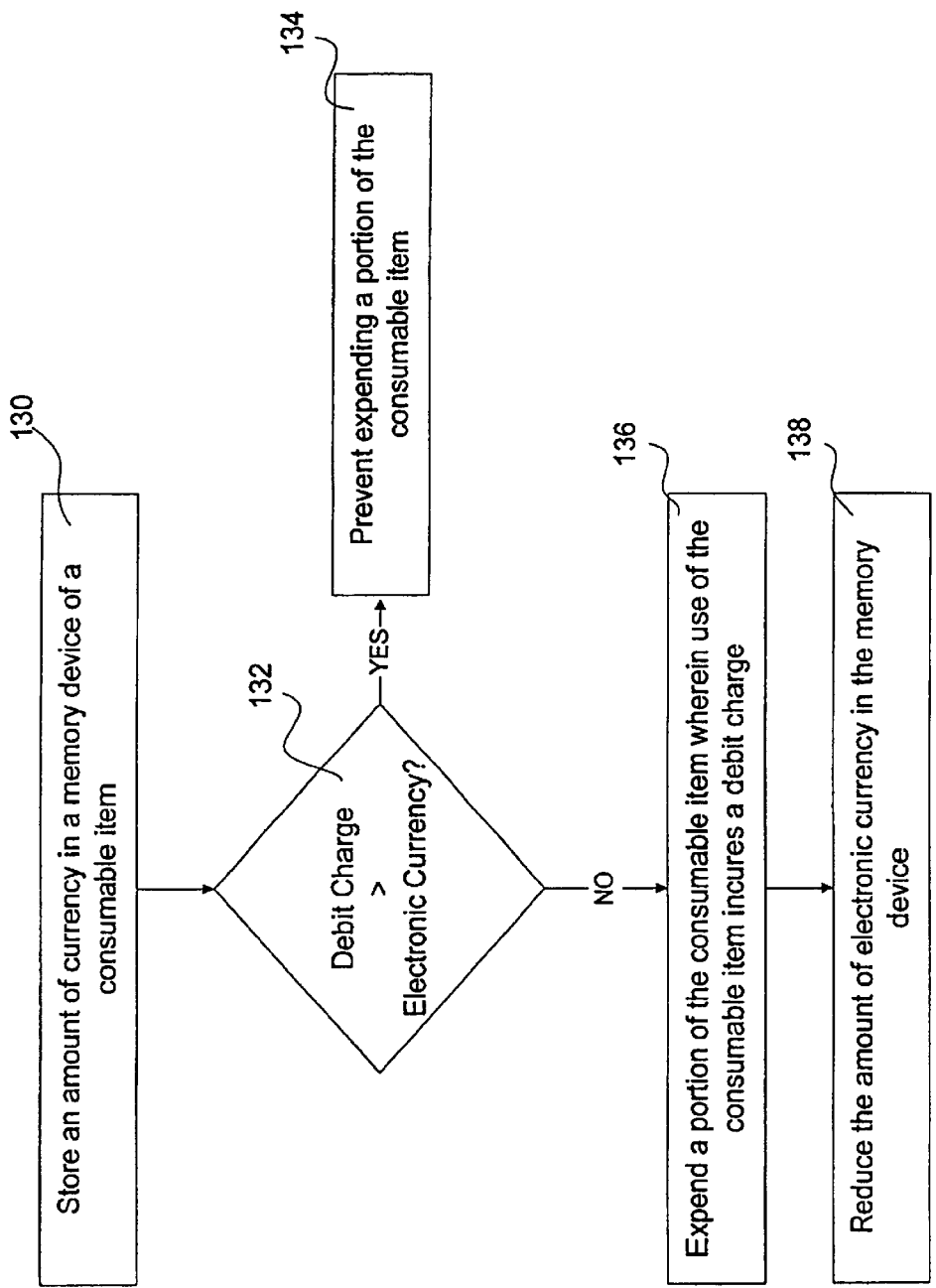
FIG. 9 is a flowchart of a first alternative exemplary method of using a consumable article.

FIG. 9 is an exemplary flowchart for a first alternative method of using the consumable article to exchange payments. In step 130, an amount of currency is stored in the memory device, preferably a smart card circuit, of a consumable item such as a media creation cartridge. When privileged content is desired to be used, such as by printing a copy of it, a debit charge will be incurred. In step 132, the amount of the debit charge is compared to the amount of electronic currency stored in the memory device. If the debit charge is greater than the amount of currency then in step 134 the consumable item is prevented from being expended. If the debit charge is less than or equal to the amount of currency stored in the memory, then in step 136 a portion of the consumable item is expended and accordingly the use of the consumable item in copying the privileged content incurs the debit charge. In step 138, the amount of electronic currency in the memory device is reduced by at least the amount of the debit charge.

Figure 10:
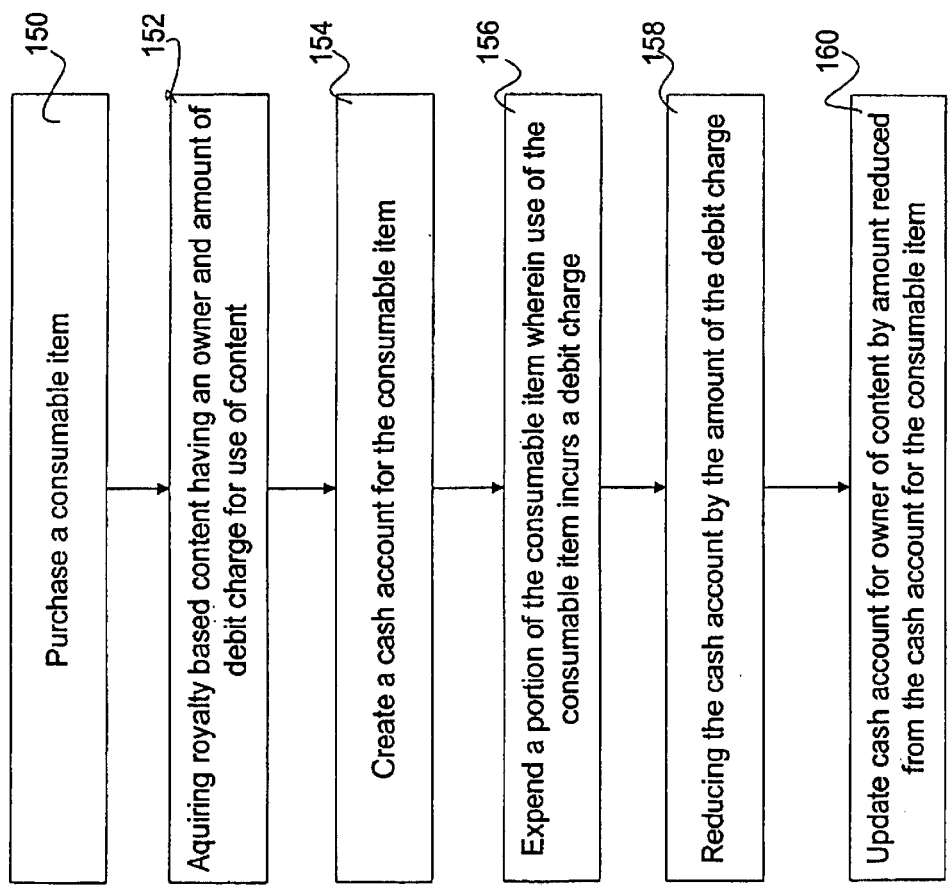
FIG. 10 is a flowchart of a second alternative exemplary method of using a consumable article.

FIG. 10 is an exemplary flowchart of a second alternative method of using the consumable article to exchange payments. In this embodiment, a person purchases a consumable item in step 150. The person then in step 152 acquires royalty based or other privileged content. The content has an owner and an amount to be debit charged for use of the content. Preferably, the owner's electronic account and the amount of use debit charge are included within a digital signature within the content. Preferably, the owner has set up the electronic account with a clearinghouse or has his/her own clearinghouse for reconciliation. In step 154, a cash account is created for the consumable item. This account can be setup when the item is purchased or pre setup by the manufacturer of the consumable item or by optionally a third party. A portion of the purchase price for the consumable item is transferred to the cash account for the consumable item or the manufacturer. In step 156, the person expends a portion of the consumable item to create privilege content such that in so doing the use of the consumable item incurs a debit charge for use of the privilege content. In step 158, when connected to the Internet or other network, the cash account for the consumable item or manufacturer is reduced by the amount of the debit charge. Reconciliation occurs when the cash account for the owner of the content is updated to reflect the amount reduced from the cash account for the consumable item or manufacturer.

What is claimed is:

1. A consumable article in the form of a media creation cartridge, comprising:
    a consumable item;
    a meter for measuring the amount of the consumable item;
    a memory device; and
    a control circuit coupled to the meter and memory device, the memory device organized by the control circuit such that the use of the consumable item causes the memory device to be reorganized by the control circuit wherein the organization of the memory device represents currency, and wherein the media creation cartridge is an ink-jet printer cartridge.

2. A consumable article in the form of a media creation cartridge, comprising:
    a consumable item;
    a meter for measuring the amount of the consumable item;
    a memory device; and
    a control circuit coupled to the meter and memory device, the memory device organized by the control circuit such that the use of the consumable item causes the memory device to be reorganized by the control circuit wherein the organization of the memory device represents currency, and wherein the media creation cartridge is a laser-jet toner cartridge.

3. A consumable article in the form of a median creation cartridge, comprising:
    a consumable item;
    a meter for measuring the amount of the consumable item;
    a memory device; and
    a control circuit coupled to the meter and memory device, the memory device organized by the control circuit such that the use of the consumable item causes the memory device to be reorganized by the control circuit wherein the organization of the memory device represents currency, and
    wherein the media creation cartridge is a plotter pen cartridge.

* * * * *

UNITED STATES PATENT AND TRADEMARK OFFICE
CERTIFICATE OF CORRECTION

PATENT NO. : 6,820,064 B1
DATED : November 16, 2004
INVENTOR(S) : Currans et al.

It is certified that error appears in the above-identified patent and that said Letters Patent is hereby corrected as shown below:

<u>Column 8,</u>
Line 20, delete "median" and insert therefor -- media --.

Signed and Sealed this

Twenty-eighth Day of June, 2005

JON W. DUDAS
*Director of the United States Patent and Trademark Office*